(12) United States Patent
Menkhoff et al.

(10) Patent No.: US 9,985,815 B2
(45) Date of Patent: May 29, 2018

(54) SIGNAL PROCESSING CHAIN SWITCHING

(71) Applicant: Intel IP Corporation, Santa Clara, CA (US)

(72) Inventors: Andreas Menkhoff, By (DE); Guenther Hackl, Altoetting (DE)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/247,042

(22) Filed: Aug. 25, 2016

(65) Prior Publication Data

US 2018/0062895 A1 Mar. 1, 2018

(51) Int. Cl.
*H04L 27/01* (2006.01)
*H04L 27/26* (2006.01)
*H04L 1/00* (2006.01)

(52) U.S. Cl.
CPC .......... *H04L 27/264* (2013.01); *H04L 1/0038* (2013.01); *H04L 27/2644* (2013.01)

(58) Field of Classification Search
CPC .. H04L 27/264; H04L 1/0038; H04L 27/2644
See application file for complete search history.

(56) References Cited

U.S. PATENT DOCUMENTS

| | | | |
|---|---|---|---|
| 7,065,036 B1 | 6/2006 | Ryan | |
| 7,224,726 B2 * | 5/2007 | Perlow | H04L 25/0224 375/233 |
| 7,463,704 B1 | 12/2008 | Tehrani et al. | |
| 7,498,957 B2 * | 3/2009 | De Buys | H03H 17/0219 341/61 |
| 8,514,982 B2 * | 8/2013 | Dubash | H04B 1/001 329/315 |
| 2003/0004718 A1 | 1/2003 | Rao | |
| 2005/0227733 A1 * | 10/2005 | Lunn | H04B 1/7103 455/561 |
| 2006/0291428 A1 * | 12/2006 | Filipovic | H04B 1/0035 370/335 |
| 2008/0153433 A1 | 6/2008 | Pallonen et al. | |
| 2010/0041355 A1 | 2/2010 | Laroia et al. | |
| 2010/0045874 A1 | 2/2010 | Hafemeister | |
| 2010/0093282 A1 | 4/2010 | Martikkala et al. | |
| 2011/0092177 A1 | 4/2011 | Sorrells et al. | |
| 2011/0212695 A1 | 9/2011 | Wild et al. | |
| 2014/0105325 A1 * | 4/2014 | Huang | H04L 27/2649 375/296 |

(Continued)

OTHER PUBLICATIONS

Search Report dated Oct. 5, 2017 for International Patent Application No. PCT/US17/043433.

*Primary Examiner* — Dac Ha
(74) *Attorney, Agent, or Firm* — Schiff Hardin LLP

(57) ABSTRACT

A signal processing device including a first signal processing chain having a first output signal; a second signal processing chain comprising a second output signal with a higher accuracy than the first output signal; a controller configured to switch, based on a desired accuracy, whether to switch between the first and second signal processing chains as a path for an original input signal; and a modifier configured to modify the original input signal, the first output signal, or the second output signal to generate a modified input, a modified first output, or a modified second output signal when the controller switches between the first and second signal processing chains.

23 Claims, 6 Drawing Sheets

(56) References Cited

U.S. PATENT DOCUMENTS

| | | | |
|---|---|---|---|
| 2014/0140387 A1* | 5/2014 | Kumar | H04L 25/0307 375/232 |
| 2014/0176213 A1* | 6/2014 | Rylov | H03H 11/265 327/237 |
| 2014/0241314 A1 | 8/2014 | Raleigh et al. | |
| 2015/0280804 A1 | 10/2015 | Melzer et al. | |
| 2015/0358116 A1* | 12/2015 | Khayrallah | H04L 1/0054 375/341 |

\* cited by examiner

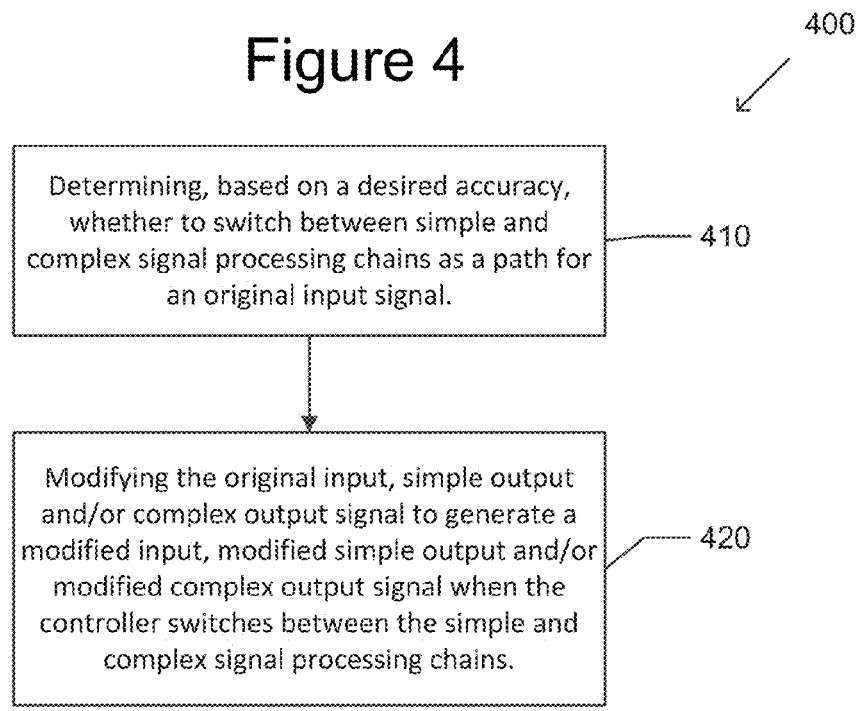
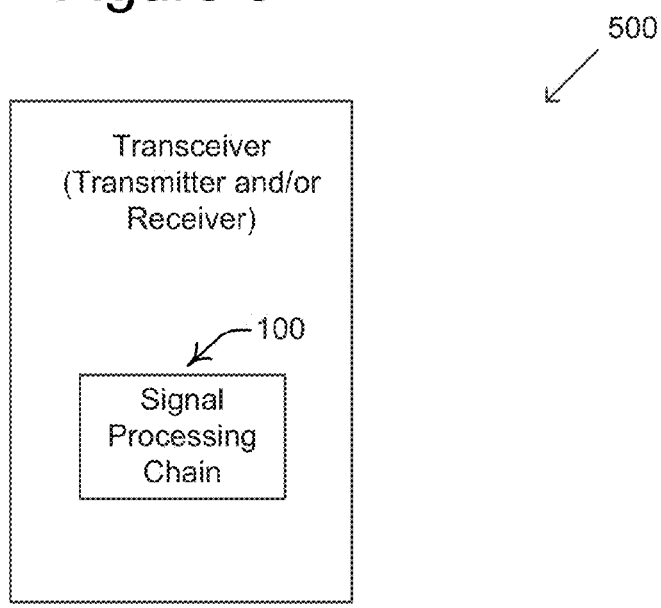

SIGNAL PROCESSING CHAIN SWITCHING

BACKGROUND

Radio frequency transmitters support protocols such as Universal Mobile Telecommunications Service (UMTS), Long Term Evolution (LTE), 5G, and Wireless Local Area Network (WLAN). Transmitter hardware should have signal processing that provides a quality output signal, even during highest output power, highest bandwidth allocation, and worst network signaling values. Often, however, transmission occurs during less than these non-ideal conditions, thereby making a highest quality signal processing quality not necessary.

A scalable signal processing device, as discussed herein, has as options at least two signal processing chains—a simple signal processing chain and a complex signal processing chain—having different signal processing qualities. The simple signal processing chain has less current consumption and a lower transmission quality, whereas the complex signal processing chain has a higher current consumption and a higher transmission quality.

The scalable signal processing device chooses between the simple and complex signal processing chains based on signaling conditions. With either choice, the output signal should be smooth enough to appear as if processed by the complex signal processing chain. Also, when switching between chains, there should be a seamless transition with the output signal having no noticeable glitch.

BRIEF DESCRIPTION OF THE DRAWINGS

FIG. 4 illustrates a flow diagram of a signal processing method in accordance with an aspect of the disclosure.

FIG. 5 illustrates a schematic diagram of a transceiver comprising a signal processing device of FIGS. 1A-1C.

DETAILED DESCRIPTION

This disclosure is directed to a signal processing device having a modifier configured to modify a signal to generate a modified signal when there is a switch between signal processing chains of different signal processing qualities, thereby reducing switching glitches.

Figure 1A:
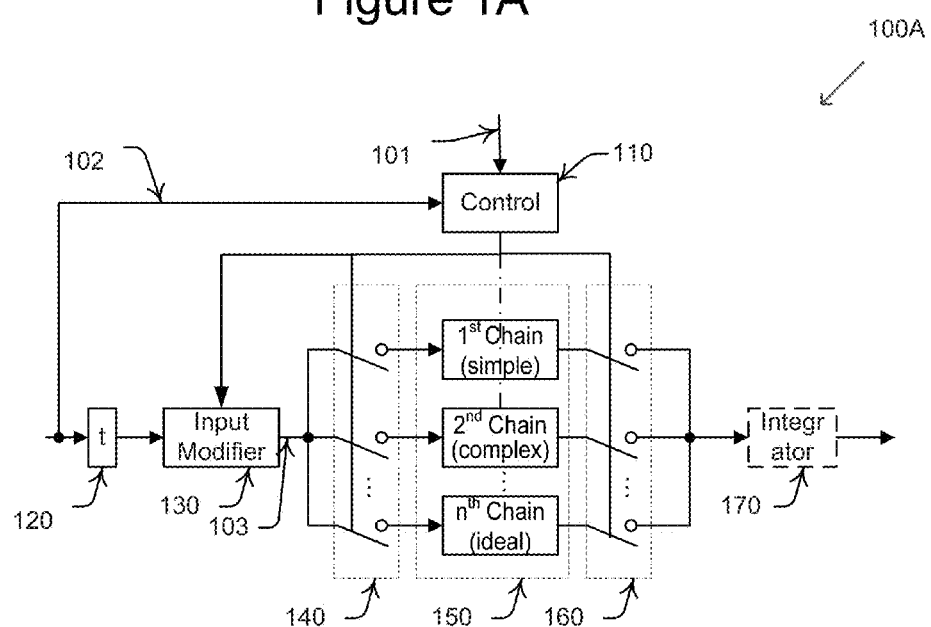
FIG. 1A illustrates a schematic diagram of a signal processing device in accordance with an aspect of the disclosure.

FIG. 1A illustrates a schematic diagram of a signal processing device 100A in accordance with an aspect of the disclosure.

The signal processing device 100A comprises a controller 110, a delay 120, an input modifier 130, a first switching bank 140, a signal processing chain bank 150, a second switching bank 160, and an optional integrator 170.

The signal processing chain bank 150 has at least a simple (first) signal processing chain and a complex (second) signal processing chain. The simple processing chain has a simple (first) output signal. The complex signal processing chain has a complex (second) output signal having a higher accuracy than the simple output signal. The ideal signal processing chain is hypothetical. While two, non-hypothetical signal processing chains are shown, there may be any number of signal processing chains having different signal processing qualities as suitable for the intended purpose.

The simple signal processing chain may be separate from, or alternatively, share at least a portion of the hardware with the complex signal processing chain. For example, these chains may be filters, and the simple signal processing chain may perform a first order deviation, and the complex signal processing chain may perform second and third order deviations. In this case, the complex signal processing chain does not need to recalculate the first order deviation calculated by the simple signal processing chain. The vertical dotted line between the simple and complex signal processing chains shown in FIG. 1A indicates that information may be transferred between the signal processing chains.

Figure 2A:
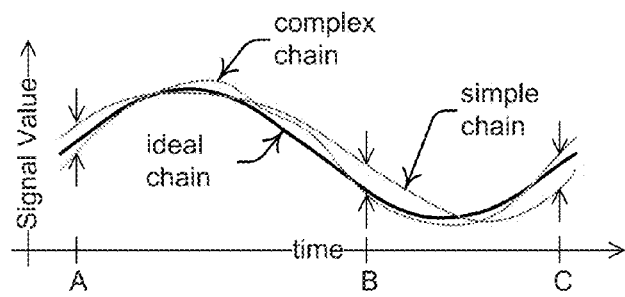
FIG. 2A illustrates a graph of signal outputs of signal processing chains as in a conventional signal processing device.

FIG. 2A illustrates a graph 200A of output signal versus time of the signal processing chains as in a conventional signal processing device. The complex output signal is close to the ideal (hypothetical) output signal. The simple output signal has larger deviations. Switches between signal processing chains occur at switching points A, B, and C. After first switching point A, the complex output signal has a negative deviation and the simple output signal has a positive deviation. At a subsequent switching point B, the complex output signal has a negative deviation and the simple output signal has a positive deviation. At each of the switching points A, B, C there is an error, and these errors can accumulate with an increased number of switches back and forth. The result may be a random walk, eventually causing the simple/complex output signal to have a much greater deviation from the hypothetical, ideal signal.

Returning to FIG. 1A, the controller 110 is configured to switch, based on a desired signal processing accuracy, when to switch between the simple and complex signal processing chains as a path for an original input signal 102. This determination may be based on a control signal 101 received from outside the signal processing device 100A. By way of example, this control signal 101 may comprise information selected from a group of information consisting of output power, transmit band, receive band, frequency distance between the transmit and receive bands, number of allocated orthogonal frequency-division multiplexing (OFDM) sub-carriers, number of used physical resource blocks, bandwidth of transmit signal, and signaling information. Using this information, the controller 110 calculates, or switches via a look up table, a level of accuracy the signal processing chain should have, that is, simple, complex, or an alternative accuracy level.

Aside from the controller 110 being configured to determine a switching time based on the control signal 101, the determination may be based on the original input signal 102. The controller 110 monitors the original input signal 102 to determine when the original input signal 102 and the modified input signal 103 differ by less than a predetermined amount, and at this time switch between signal processing chains when there would be less of a glitch. The delay 120 is added to compensate for the controller 110's processing time.

It may be beneficial that before a switching between different signal processing chains is performed, the different signal processing chains are settled, following modification of the original input signal 102, by at least a predetermined amount. More specifically, the controller 110 may switch between the simple and complex signal processing chains after a predetermined amount of time following modification of the original input signal 102, the predetermined amount of time being at least a group delay of the first and second signal processing chains. A group delay is a time delay of amplitude envelopes of various sinusoidal components of a signal through a device, and is a function of frequency for each component. The predetermined amount of time may also, or alternatively, be no more than an impulse response time of the first and second signal processing chains.

The switching times, rather than being determined by the controller 110, may alternatively occur at predetermined switching times. These predetermined switching times may force the switches to occur within a guard interval, and thus only redundant data of the original input signal 102 are modified.

The complex output signal may have a higher accuracy than the simple output signal based on any of a number of factors. The simple output signal may have a power series of the n-th order, whereas the complex output signal may have a power series of the m-th order, where m is greater than n. Alternatively, the complex output signal may be signal processed with a higher sampling rate than the simple output signal. Each of the first and second signal processing chains may be a filter, and the complex signal processing chain may have a higher impulse response that the simple signal processing chain. If the signal processing device is comprised within a polar transmitter, the complex signal processing chain may perform a transfer from rectangular to polar coordinates on a higher sampling rate than the simple signal processing chain. If the signal processing device is comprised within a receiver, each of the simple and complex signal processing chains, during a high signal-to-noise ratio, may perform channel estimation on known symbols, and the complex signal processing chain may additionally use decision directed or blind estimations.

The input modifier 130 is coupled upstream of the signal processing chain bank 150, and is configured to modify the original input signal 102 to generate a modified input signal 103 when the controller 110 switches between the simple and complex signal processing chains. The input modifier 130 is further configured to modify the original input signal 102 when the simple and complex output signals are substantially equal.

When the controller 110 determines that there should be a switch between the simple and complex signal processing chains as a path for the original input signal 102, the controller 110 causes the input modifier 130 to modify the original input signal 102 to generate the modified input signal 103. The modified input signal 103 is a simplified version of the original input signal 102 so that all signal processing chains produce a same output signal, as discussed further below with respect to FIGS. 3A and 3B. The controller 110 controls each of the first and second switching banks 140, 160 to switch to the positions corresponding to the selected signal processing chain (simple or complex).

Figure 2B:
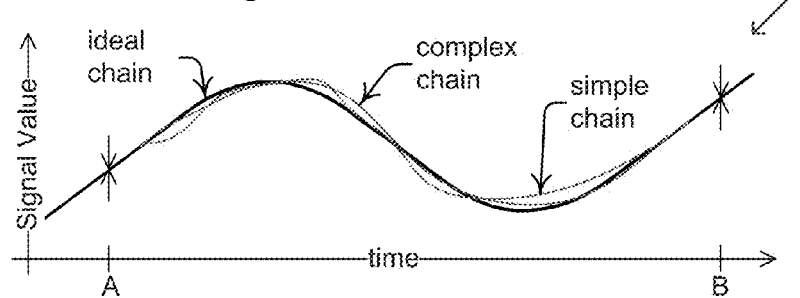
FIG. 2B illustrates a graph of signal outputs of signal processing chains of the signal processing devices of FIGS. 1A-1C.

FIG. 2B illustrates a graph 200B of output signal versus time of the signal processing chains of the signal processing device 100A.

The best switching times are when the output signals of the simple and complex signal processing chains are substantially equal. The simple and complex output signals are equal to one another at both of timing points A and B because the input modifier 130 modifies the original input signal 102 to be the modified input signal 103. After switching points A and B, the simple and complex output signals have positive and negative deviations with respect to the hypothetical ideal output signal. At switching points A and B it does not matter which signal processing chain is selected as both simple and complex outputs signals are linear interpolation of the straight line and thus substantially equal.

The integrator 170 is optional and is configured to integrate output signals of the simple and complex signal processing chains, thereby accumulating errors. The integrator 170 may comprise a digital controlled oscillator (DCO). For every frequency input to the DCO, there is a phase at its output. The integrator 170 summarizes these phase errors due to the different frequencies. The integrator 170 therefore integrates the glitches due to switching between the signal processing chains, and random also integrates walk errors.

Figure 1B:
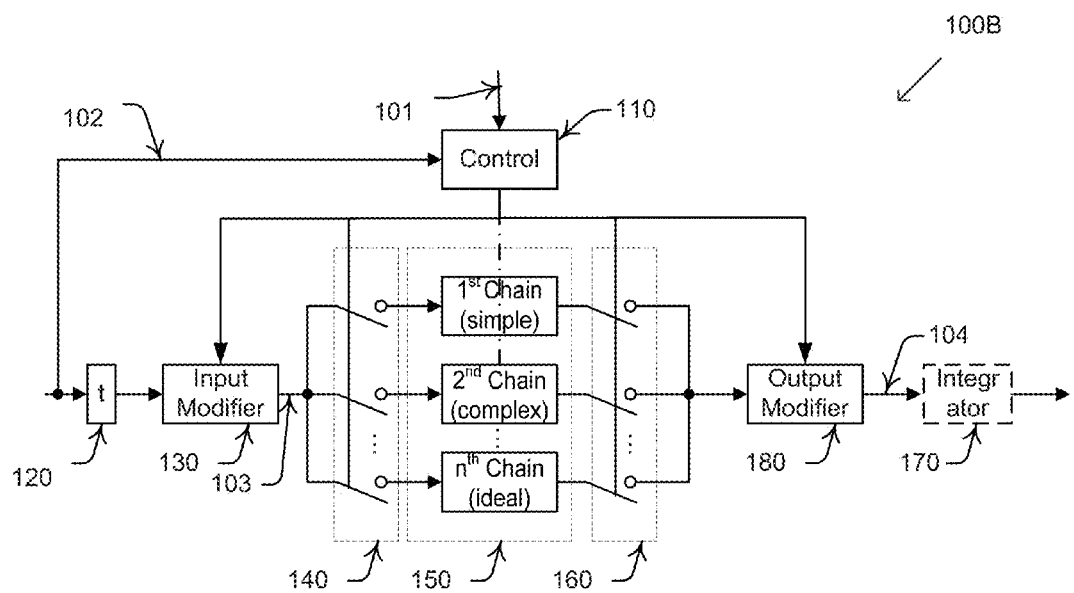
FIG. 1B illustrates a schematic diagram of a signal processing device in accordance with another aspect of the disclosure.

FIG. 1B illustrates a schematic diagram of a signal processing device 100B in accordance with another aspect of the disclosure.

The signal processing device 100B of FIG. 1B differs from the signal processing device 100A of FIG. 1A in that it additionally comprises an output modifier 180 coupled downstream of the signal processing chain bank 150. The output modifier 180 is configured to modify the simple and/or complex output signal, depending on which of the signal processing chains is selected, to generate a modified simple and/or modified complex output signal when the controller switches between the first and second signal processing chains. The output modifier 180 functions in a manner similar to the input modifier 130, and for the sake of brevity, a description will not be repeated here.

As an additional feature, the controller 110 may be further configured to estimate a difference error between output signals of the signal processing chains. Referring to FIG. 2A, the controller 110 may be configured to estimate a difference between the simple and complex output signals, or a difference between one or both of these signals from the ideal (hypothetical) output signal. The output modifier 180 then adjusts for this difference error at a next switching point. The greater the number of switching points between signal processing chains, the greater a random walk error accumulation of the output signal. This additional feature of removing a difference error thus further improves the output signal quality.

Figure 1C:
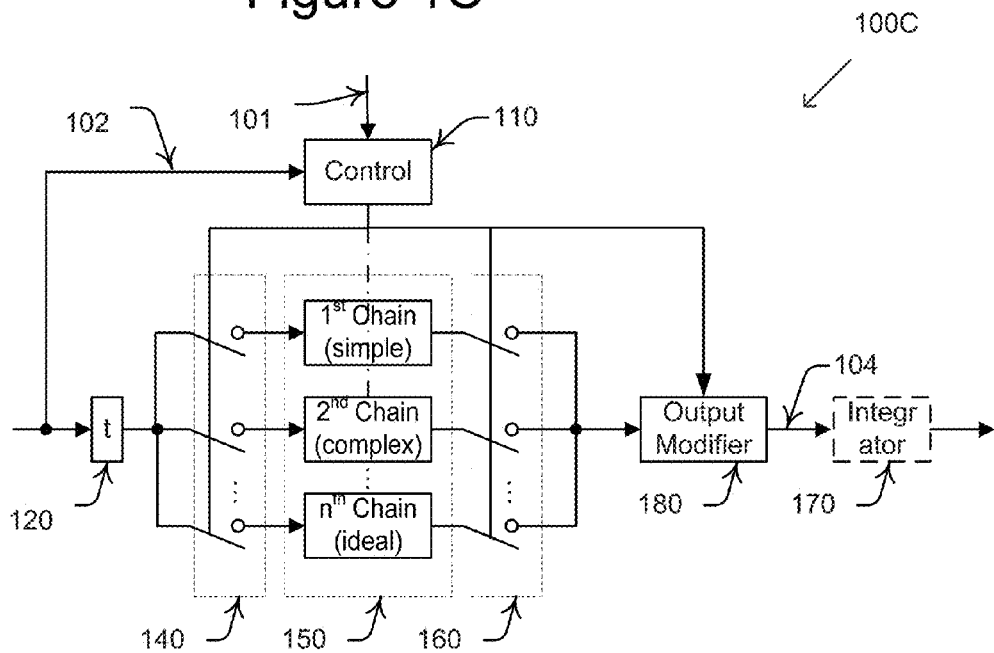
FIG. 1C illustrates a schematic diagram of a signal processing device in accordance with another aspect of the disclosure.

FIG. 1C illustrates a schematic diagram of a signal processing device 100C in accordance with another aspect of the disclosure.

The signal processing device 100C of FIG. 1C differs from the signal processing device 100B of FIG. 1B in that it does not comprise the input modifier 130 coupled upstream of the signal processing chain bank 150, only the output modifier 180 coupled downstream of the signal processing chain bank 150. The input modifier 130 was discussed above with respect to the signal processing device 100A of FIG. 1A.

Figures 1, 3A:
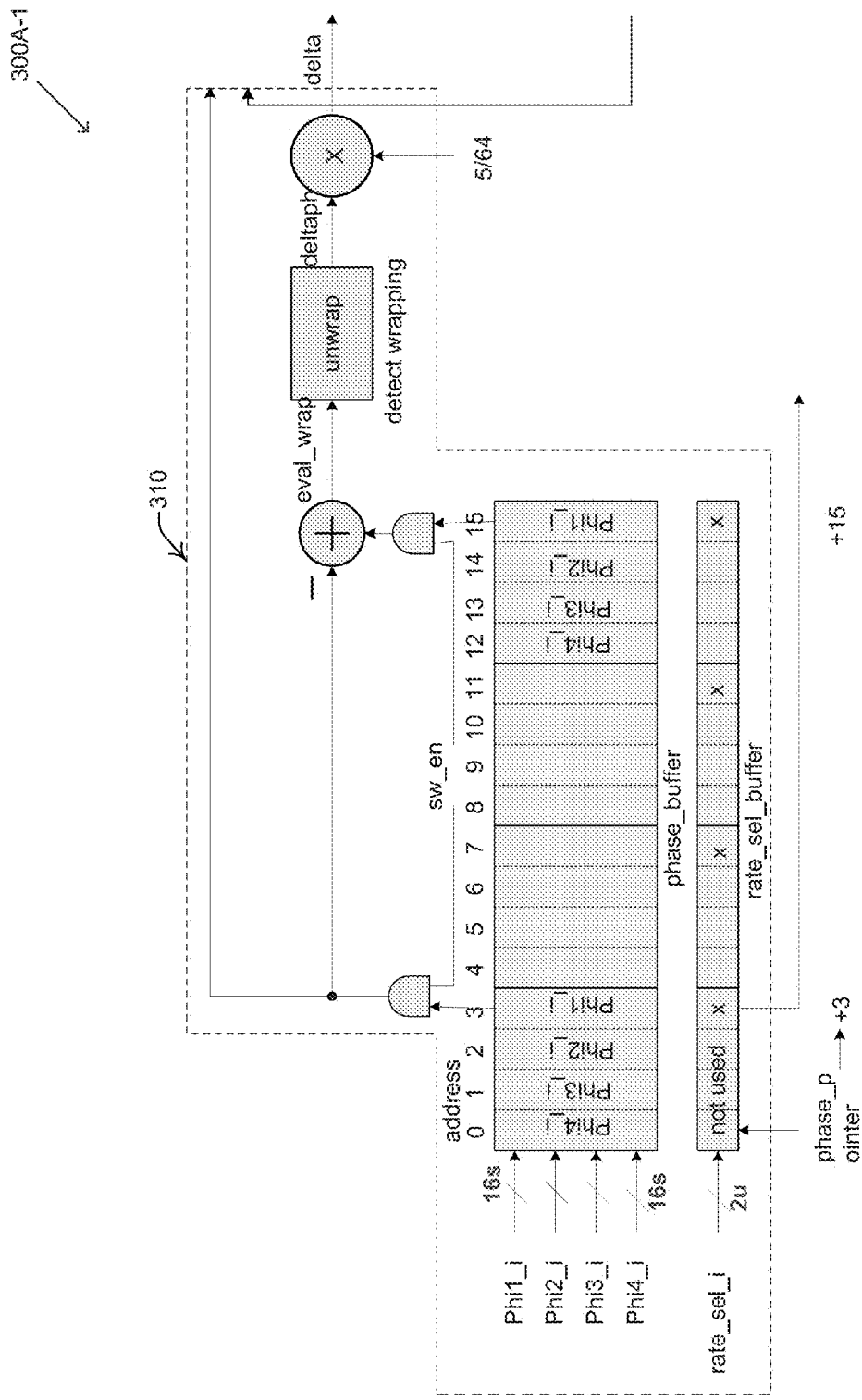
FIG. 3A illustrates a schematic diagram of an input/output modifier, as shown in FIGS. 1A-1C, in accordance with an aspect of the disclosure.
Figures 2, 3A:
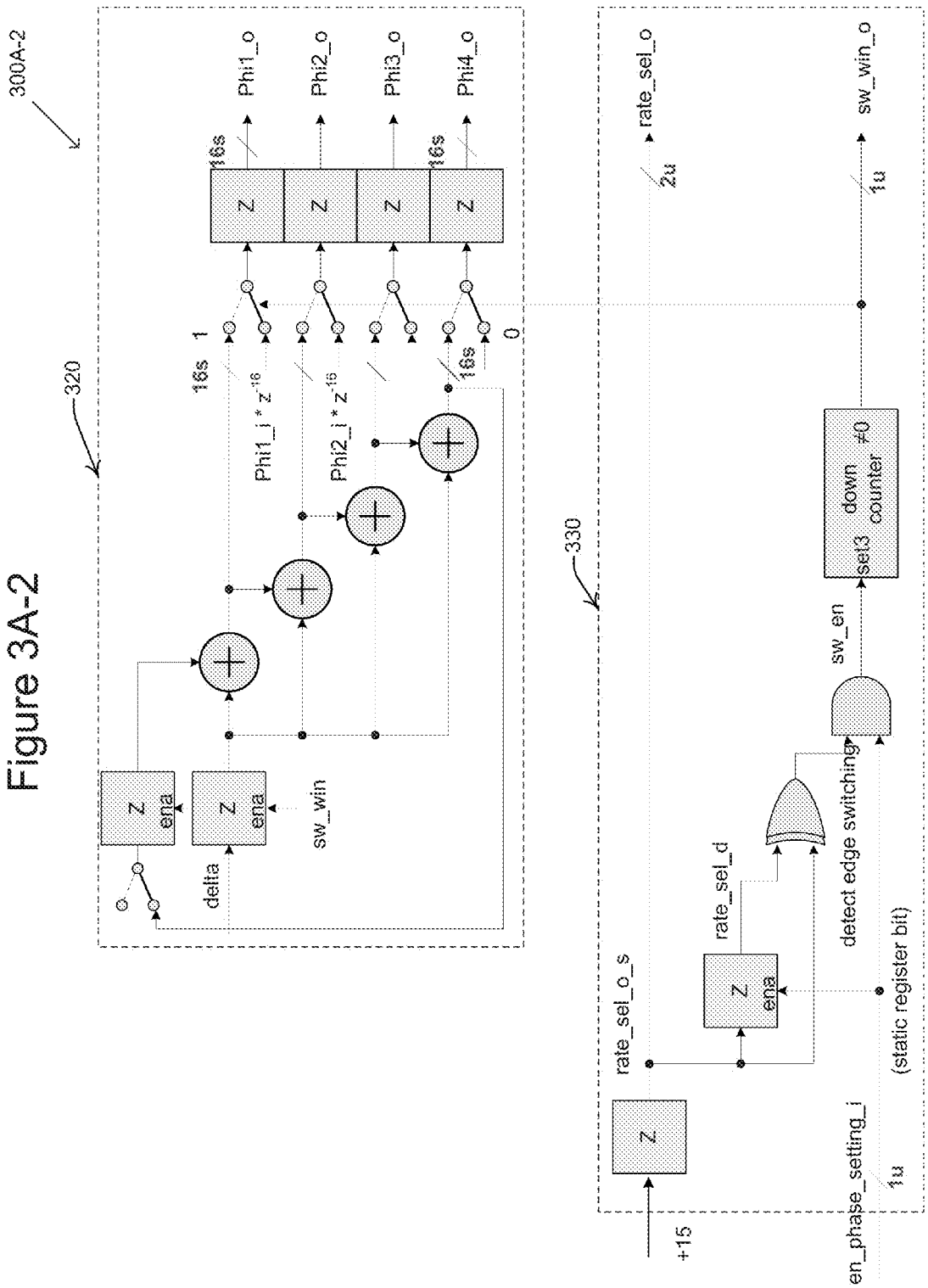
Figure 3B:
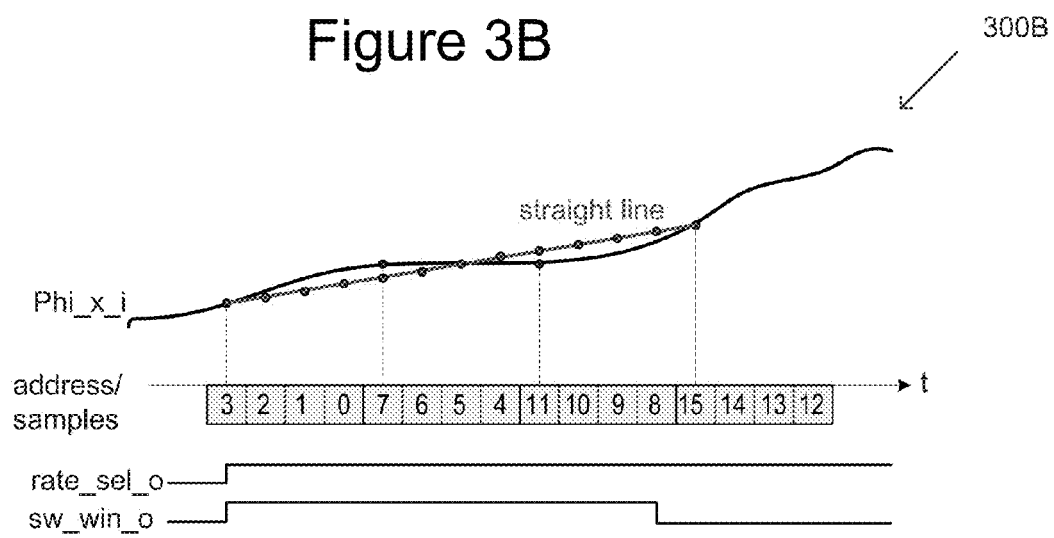
FIG. 3B illustrates a graph of an output signal of an input/output modifier, as shown in FIGS. 1A-1C.

FIG. 3A illustrates a schematic diagram of a modifier 300A, which is an input/output modifier 130/180 as shown in FIGS. 1A-1C. FIG. 3B illustrates a graph 300B of an output signal of the input/output modifier 130/180. For the sake of simplicity, the description below will refer to the input modifier 130. However, the description is also applicable to the output modifier 180.

When the controller 110 determines that there should be a switch between the simple and complex signal processing chains, the input modifier 130 is configured to modify the input signal 102 so that for a particular period of time to be a modified input signal 103. The modified input signal 103 is a linear interpolation of the original input signal 102. For example, the modified input signal 103 may be a straight line, though the disclosure is not limited in this respect.

The modifier 300A comprises interpolator 310, a multiplexer 320, and a control signal generator 330.

The interpolator 310, in this particular example, is configured to receive a set of four parallel samples to achieve an effective clock rate of 1/4, but the disclosure is not limited in thereto; there may be any number of samples, in parallel or serial, as suitable for the intended purpose. The first data set comprises samples 3, 7, 11, 15, the second data set comprises samples 2, 6, 10, 14 . . . . There are sixteen samples in the phase buffer, and for the interpolation of a straight line, only samples 3 and 15 are used, with the line starting point being the value of sample 3, and the line ending point being the value of sample 15. The increment of the line is: (value of sample 15)−(value of sample 3)/12. The division by 12 is approximated by 5/64. The samples between the start and end points are then interpolated to generate the straight line.

The multiplexer 320 is configured to switch between the original signal and the modified or straight line. The interpolator 310 has the original signal transmitted on its upper line, and the modified signal transmitted on the line just below the upper line. The multiplexer 320 adds the increment to the starting sample four times to all four data streams. By adding this increment, the original signal is overwritten as the modified signal.

The control signal generator 330 is configured to generate control signals. "rate_sel_0" indicates that switching is allowed based on control signal 101 and/or original input signal 102. "sw_win_0" indicates the window in which the original input signal 102 is replaced with a straight line. The down counter is used for various signal processing chains, with a two-bit signal indicates which of the signal processing chains is selected. In this example, there is a transition between one, two, and four sample periods. Parallel samples are used because the simple signal processing chain may use one sample path, an intermediate signal processing chain may use two sample paths, and the complex signal processing chain may use four of the four sample paths.

FIG. 4 illustrates a flow diagram 400 of a signal processing method in accordance with an aspect of the disclosure.

At Step 410, the controller 110 switches, based on a desired accuracy, between the simple and complex signal processing chains as a path for an original input signal 102.

At Step 420, the input modifier 130 and/or output modifier 180 modifies the original input signal 102, the simple output signal and/or the complex output signal to generate the modified input signal 103, the modified simple output signal and/or the modified complex output signal when the controller 110 switches between the simple and complex signal processing chains.

FIG. 5 illustrates a schematic diagram of a transceiver 500 comprising a signal processing device 100 of FIGS. 1A-1C. The transceiver may be a transmitter such as a polar transmitter, a receiver, or any other suitable device. The signal processing chains may be digital or analog.

Prior data processing devices use the complex signal processing chain consistently in order to fulfill requirements such as maximum output power, worst band combinations, all physical resource blocks allocated, network signaling values set, etc. By modifying the original input signal during switching times to reduce glitches as discussed herein, scalable signal processing chains are made possible.

Example 1 is a signal processing device, comprising a first signal processing chain having a first output signal; a second signal processing chain comprising a second output signal with a higher accuracy than the first output signal; a controller configured to switch, based on a desired accuracy, switch between the first and second signal processing chains as a path for an original input signal; and a modifier configured to modify the original input signal, the first output signal, or the second output signal to generate a modified input, a modified first output, or a modified second output signal when the controller switches between the first and second signal processing chains.

In Example 2, the subject matter of Example 1, wherein the first output signal comprises a power series of n-th order, the second output signal comprises a power series of m-th order, and m>n.

In Example 3, the subject matter of Example 1, wherein the second output signal is signal processed with a higher sampling rate than the first output signal.

In Example 4, the subject matter of Example 1, wherein each of the first and second signal processing chains is a filter, and the second signal processing chain comprises a higher impulse response that the first signal processing chain.

Example 5 is a polar transmitter, comprising: the subject matter of Example 1, wherein the second signal processing chain performs a transfer from rectangular to polar coordinates on a higher sampling rate than the first signal processing chain.

Example 6 is a receiver comprising: the subject matter of Example 1, wherein each of the first and second signal processing chains during a high signal-to-noise ratio performs channel estimation on known symbols, and wherein the second signal processing chain additionally uses decision directed or blind estimations.

In Example 7, the subject matter of Example 1, wherein the controller is further configured to switch, based on a signal processing quality of the first signal processing chain, whether to switch from the first signal processing chain to the second signal processing chain.

In Example 8, the subject matter of Example 1, wherein the modifier is further configured to modify the original input signal when output signals of the first and second signal processing chains are substantially equal.

In Example 9, the subject matter of Example 1, further comprising: an integrator configured to integrate output signals of the first and second signal processing chains.

In Example 10, the subject matter of Example 1, wherein the controller is further configured to switch between the first and second signal processing chains based on a received control signal.

In Example 11, the subject matter of Example 10, wherein the received control signal comprises information selected from the group of information consisting of output power, transmit band, receive band, frequency distance between the transmit and receive bands, number of allocated orthogonal frequency-division multiplexing (OFDM) subcarriers, number of used physical resource blocks, bandwidth of transmit signal, and signaling information.

In Example 12, the subject matter of Example 1, wherein the controller is further configured to switch between the first and second signal processing chains at a predetermined switching time.

In Example 13, the subject matter of Example 1, wherein the controller is further configured to switch between the first and second signal processing chains when the original input signal and the modified input signal differ by less than a predetermined amount.

In Example 14, the subject matter of Example 1, wherein the controller is further configured to switch between the first and second signal processing chains after the first and second signal processing chains have settled, following modification of the original input signal, by at least a predetermined amount.

In Example 15, the subject matter of Example 14, wherein the controller is further configured to switch between the first and second signal processing chains after a predetermined amount of time following modification of the original input signal, the predetermined amount of time being at least a group delay of the first and second signal processing chains.

In Example 16, the subject matter of Example 14, wherein the controller is further configured to switch between the first and second signal processing chains after a predetermined amount of time following modification of the original input signal, the predetermined amount of time being no more than an impulse response time of the first and second signal processing chains.

In Example 17, the subject matter of Example 1, wherein the modified input signal is a linear interpolation of a straight line of the original input signal.

In Example 18, the subject matter of Example 1, wherein the modifier is an input modifier coupled upstream of the first and second signal processing chains.

In Example 19, the subject matter of Example 1, wherein the modifier is an output modifier coupled downstream of the first and second signal processing chains.

In Example 20, the subject matter of Example 19, wherein: the controller is further configured to estimate a difference between output signals of the first and second signal processing chains, and the output modifier is further configured to remove, during a subsequent switch between the first and second signal processing chains, the estimated difference from the output signal of the first or second signal processing chain.

Example 21 is a signal processing method performed by a signal processing device including a first signal processing chain with a first output signal and a second signal processing chain having a second output signal with a higher accuracy than the first output signal, the method comprising: switching, by a controller, based on a desired accuracy, whether to switch between the first and second signal processing chains as a path for an original input signal; and modifying, by a modifier, the original input, the first output signal, or the second output signal to generate a modified input, a modified first output, or a modified second output signal when the controller switches between the first and second signal processing chains.

In Example 22, the subject matter of Example 21, further comprising: modifying, by the modifier, the original input signal when output signals of the first and second signal processing chains are substantially equal.

In Example 23, the subject matter of Example 21, further comprising: integrating, by an integrator, output signals of the first and second signal processing chains.

In Example 24, the subject matter of Example 21, further comprising: switching, by the controller, between the first and second signal processing chains when the original input signal and the modified input signal differ by less than a predetermined amount.

In Example 25, the subject matter of Example 21, wherein: the modifier is an output modifier coupled downstream of the first and second signal processing chains, and the signal processing method further comprises: estimating by the controller, a difference between output signals of the first and second signal processing chains, and removing, by the output modifier during a subsequent switch between the first and second signal processing chains, the estimated difference from the output signal of the first or second signal processing chain.

In Example 26, the subject matter of any of Examples 1-9, wherein the controller is further configured to switch between the first and second signal processing chains based on a received control signal.

In Example 29, the subject matter of any of Examples 1-9, wherein the controller is further configured to switch between the first and second signal processing chains when the original input signal and the modified input signal differ by less than a predetermined amount.

In Example 28, the subject matter of any of Examples 21-24, wherein: the modifier is an output modifier coupled downstream of the first and second signal processing chains, and the further comprises: estimating by the controller, a difference between output signals of the first and second signal processing chains, and removing, by the output modifier during a subsequent switch between the first and second signal processing chains, the estimated difference from the output signal of the first or second signal processing chain.

Example 29 is a signal processing device, comprising: a first signal processing chain having a first output signal; a second signal processing chain and having a second output signal having a higher accuracy than the first output signal; a controlling means for switching, based on a desired accuracy, between the first and second signal processing chains as a path for an original input signal; and a modifying means for modifying the original input, first output, or second output signal to generate a modified input, modified first output, or modified second output signal when the controller switches between the first and second signal processing chains.

In Example 30, the subject matter of Example 29, wherein the controlling means is further for switching, based on a signal processing quality of the first signal processing chain, from the first signal processing chain to the second signal processing chain.

In Example 31, the subject matter of Example 29, wherein the modifying means is further for modifying the original input signal when output signals of the first and second signal processing chains are substantially equal.

In Example 32, the subject matter of Example 29, wherein the controlling means is further for switching between the first and second signal processing chains based on a received control signal.

In Example 33, the subject matter of Example 29, wherein the controlling means is further for switching between the first and second signal processing chains at a predetermined switching time.

In Example 34, the subject matter of Example 29, wherein the controlling means is further for switching between the first and second signal processing chains when the original input signal and the modified input signal differ by less than a predetermined amount.

In Example 35, the subject matter of Example 29, wherein the controlling means is further for switching between the first and second signal processing chains after the first and second signal processing chains have settled, following modification of the original input signal, by at least a predetermined amount.

In Example 36, the subject matter of Example 35, wherein the controlling means is further for switching between the first and second signal processing chains after a predetermined amount of time following modification of the original input signal, the predetermined amount of time being at least a group delay of the first and second signal processing chains.

In Example 37, the subject matter of Example 35, wherein the controlling means is further switching between the first and second signal processing chains after a predetermined amount of time following modification of the original input signal, the predetermined amount of time being no more than an impulse response time of the first and second signal processing chains.

In Example 38, the subject matter of Example 29, wherein the modifying means is an input modifier coupled upstream of the first and second signal processing chains.

In Example 39, the subject matter of Example 29, wherein the modifying means is an output modifier coupled downstream of the first and second signal processing chains.

In Example 40, the subject matter of Example 39, wherein: the controlling means is further for estimating a difference between output signals of the first and second signal processing chains, and the output modifying means is further for removing, during a subsequent switch between the first and second signal processing chains, the estimated difference from the output signal of the first or second signal processing chain.

Example 41 is an apparatus substantially as shown and described.

Example 42 is a method substantially a shown and described.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A signal processing device, comprising:
   a first signal processing chain having a first output signal;
   a second signal processing chain having a second output signal with a higher accuracy than the first output signal;
   a controller configured to switch, based on a desired accuracy and on a received control signal, between the first and second signal processing chains as a path for an original input signal; and
   a modifier configured to modify the original input signal to the first and second signal processing chains, or the first or second output signal from the first and second signal processing chains, respectively, to reduce any glitch when the controller switches between the first and second signal processing chains,
   wherein the received control signal comprises information selected from the group of information consisting of output power, transmit band, receive band, frequency distance between the transmit and receive bands, number of allocated orthogonal frequency-division multiplexing (OFDM) subcarriers, number of used physical resource blocks, bandwidth of transmit signal, and signaling information.

2. The signal processing device of claim 1, wherein the first output signal comprises a power series of n-th order, the second output signal comprises a power series of m-th order, and m>n.

3. The signal processing device of claim 1, wherein the second output signal is signal processed with a higher sampling rate than the first output signal.

4. The signal processing device of claim 1, wherein each of the first and second signal processing chains is a filter, and the second signal processing chain comprises a higher impulse response than the first signal processing chain.

5. A polar transmitter, comprising:
   the signal processing device of claim 1,
   wherein the second signal processing chain performs a transfer from rectangular to polar coordinates on a higher sampling rate than the first signal processing chain.

6. A receiver comprising:
   the signal processing device of claim 1,
   wherein each of the first and second signal processing chains performs channel estimation on known symbols, and
   wherein the second signal processing chain additionally uses decision directed or blind estimations.

7. The signal processing device of claim 1, wherein the controller is further configured to switch, based on a signal processing quality of the first signal processing chain, from the first signal processing chain to the second signal processing chain.

8. The signal processing device of claim 1, wherein the modifier is further configured to modify the original input signal when output signals of the first and second signal processing chains are substantially equal.

9. The signal processing device of claim 1, further comprising:
   an integrator configured to integrate output signals of the first and second signal processing chains.

10. The signal processing device of claim 1, wherein the controller is further configured to switch between the first and second signal processing chains at a predetermined switching time.

11. The signal processing device of claim 1, wherein the controller is further configured to switch between the first and second signal processing chains when the original input signal and the modified input signal differ by less than a predetermined amount.

12. The signal processing device of claim 1, wherein the controller is further configured to switch between the first and second signal processing chains after the first and second signal processing chains have settled, following modification of the original input signal, by at least a predetermined amount.

13. The signal processing device of claim 12, wherein the controller is further configured to switch between the first and second signal processing chains after a predetermined amount of time following modification of the original input signal, the predetermined amount of time being at least a group delay of the first and second signal processing chains.

14. The signal processing device of claim 12, wherein the controller is further configured to switch between the first and second signal processing chains after a predetermined amount of time following modification of the original input signal, the predetermined amount of time being no more than an impulse response time of the first and second signal processing chains.

15. The signal processing device of claim 1, wherein the modified input signal is a linear interpolation of a straight line of the original input signal.

16. The signal processing device of claim 1, wherein the modifier is an input modifier coupled upstream of the first and second signal processing chains.

17. The signal processing device of claim 1, wherein the modifier is an output modifier coupled downstream of the first and second signal processing chains.

18. The signal processing device of claim 17, wherein:
the controller is further configured to estimate a difference between output signals of the first and second signal processing chains, and
the output modifier is further configured to remove, during a subsequent switch between the first and second signal processing chains, the estimated difference from the output signal of the first or second signal processing chain.

19. A signal processing method performed by a signal processing device including a first signal processing chain with a first output signal and a second signal processing chain having a second output signal with a higher accuracy than the first output signal, the method comprising:
switching, by a controller, based on a desired accuracy, between the first and second signal processing chains as a path for an original input signal;
modifying, by a modifier, the original input signal to the first and second signal processing chains, or the first and second output signal from the first and second signal processing chains, respectively, to reduce any glitch when the controller switches between the first and second signal processing chains; and
switching, by the controller, between the first and second signal processing chains when the original input signal and the modified input signal differ by less than a predetermined amount.

20. The signal processing method of claim 19, further comprising:
modifying, by the modifier, the original input signal when output signals of the first and second signal processing chains are substantially equal.

21. The signal processing method of claim 19, further comprising:
integrating, by an integrator, output signals of the first and second signal processing chains.

22. The signal processing method of claim 19, wherein:
the modifier is an output modifier coupled downstream of the first and second signal processing chains, and
the signal processing method further comprises:
estimating by the controller, a difference between output signals of the first and second signal processing chains, and
removing, by the output modifier during a subsequent switch between the first and second signal processing chains, the estimated difference from the output signal of the first or second signal processing chain.

23. A signal processing device, comprising:
a first signal processing chain having a first output signal;
a second signal processing chain having a second output signal with a higher accuracy than the first output signal;
a controller configured to switch, based on a desired accuracy, between the first and second signal processing chains as a path for an original input signal; and
a modifier configured to modify the original input signal to the first and second signal processing chains, or the first or second output signal from the first and second signal processing chains, respectively, to reduce any glitch when the controller switches between the first and second signal processing chains,
wherein the modifier is an input modifier coupled upstream of the first and second signal processing chains or an output modifier coupled downstream of the first and second signal processing chains.

* * * * *